(12) United States Patent
Powell et al.

(10) Patent No.: US 8,250,652 B1
(45) Date of Patent: Aug. 21, 2012

(54) SYSTEMS AND METHODS FOR CIRCUMVENTING MALICIOUS ATTEMPTS TO BLOCK THE INSTALLATION OF SECURITY SOFTWARE

(75) Inventors: Brian Powell, El Segundo, CA (US); Shaun Cooley, El Segundo, CA (US)

(73) Assignee: Symantec Corporation, Mountain View, CA (US)

(*) Notice: Subject to any disclaimer, the term of this patent is extended or adjusted under 35 U.S.C. 154(b) by 474 days.

(21) Appl. No.: 12/391,696

(22) Filed: Feb. 24, 2009

(51) Int. Cl.
*G06F 11/00* (2006.01)

(52) U.S. Cl. .......................................................... 726/22

(58) Field of Classification Search ................... 726/22
See application file for complete search history.

(56) References Cited

U.S. PATENT DOCUMENTS

| | | | | |
|---|---|---|---|---|
| 5,956,481 A | * | 9/1999 | Walsh et al. | 726/23 |
| 6,192,475 B1 | * | 2/2001 | Wallace | 713/190 |
| 7,757,284 B1 | * | 7/2010 | Viljoen | 726/22 |
| 2007/0180509 A1 | * | 8/2007 | Swartz et al. | 726/9 |
| 2007/0186284 A1 | * | 8/2007 | McConnell | 726/25 |
| 2009/0165136 A1 | * | 6/2009 | Obrecht et al. | 726/24 |

\* cited by examiner

*Primary Examiner* — Kambiz Zand
*Assistant Examiner* — Abiy Getachew
(74) *Attorney, Agent, or Firm* — Advantedge Law Group

(57) ABSTRACT

Computer-implemented methods and systems for circumventing malicious attempts to block the installation of security-software programs are disclosed. An exemplary method for performing such a task may comprise: 1) detecting, during installation of a security-software program, an error that is indicative of an attack on the security-software program, 2) identifying at least one executable file targeted by the attack on the security-software program, 3) circumventing the attack by dynamically obfuscating the executable file targeted by the attack, and then 4) completing installation of the security-software program.

18 Claims, 6 Drawing Sheets

200

SYSTEMS AND METHODS FOR CIRCUMVENTING MALICIOUS ATTEMPTS TO BLOCK THE INSTALLATION OF SECURITY SOFTWARE

BACKGROUND

In recent years, computer-security researchers have discovered that some malicious computer programs ("malware") attempt to prevent computer-security software from installing by targeting and then blocking, by name, executable files and services that are associated with the security software. Unfortunately, by preventing security software from installing, such malware may avoid detection and/or removal. As such, the instant disclosure identifies a need for systems and methods for circumventing malicious attempts to block security software from being installed or launched.

SUMMARY

As will be described in greater detail below, the instant disclosure generally relates to systems and methods for circumventing malicious attempts to block the installation of security software. In one example, an exemplary method for performing such a task may comprise: 1) detecting, during installation of a security-software program, an error that is indicative of an attack on the security-software program, 2) identifying an executable file or service that is affected by the attack (e.g., an executable file within the security-software program that is being blocked or prevented from launching), and then 3) circumventing the attack by dynamically obfuscating the executable file or service that is affected by the attack.

The system may dynamically obfuscate affected executable files and services by, for example: 1) renaming the executable file or service, 2) modifying an install path for the executable file, 3) creating a symbolic link to the executable file or service, 4) copying the executable file, 5) modifying a property of the executable file (by, for example, removing version information from the executable file and/or removing a digital certificate from the executable file), and/or 6) by performing any other operation that may obfuscate the origin and/or identity of the affected executable file or service.

In some examples, the method may also comprise dynamically obfuscating reference points associated with the affected executable file or service. For example, the system may dynamically rename registry keys, operating-system configuration files (such as INI files), proprietary-settings files, and/or service-registration files associated with the affected executable files or services.

In some examples, the method may also comprise: 1) detecting a security threat that is the source of the attack and then 2) neutralizing or removing the security threat. Upon neutralizing or removing the security threat, the system may restore all obfuscated files, services, and reference points to their original state.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
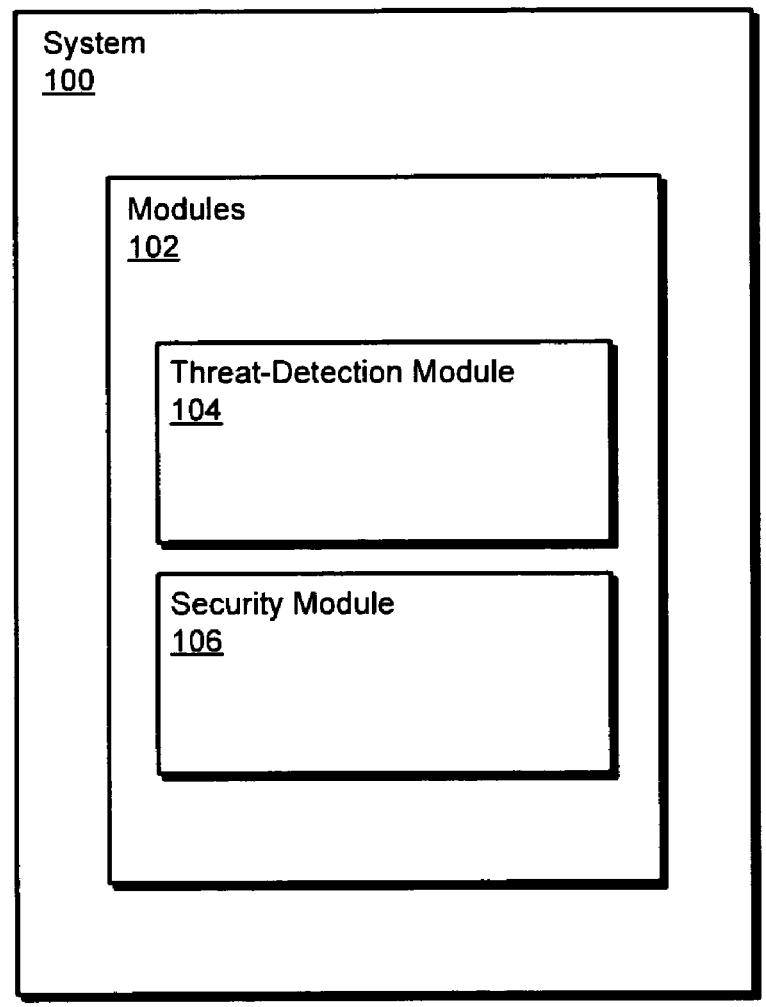
FIG. 1 is a block diagram of an exemplary system for circumventing malicious attempts to block the installation of security software according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for circumventing malicious attempts to block the installation of security software. The phrases "security software" and "security-software program," as used herein, generally refer to any type or form of computer program used to identify, remove, and/or protect against malicious computer programs. Examples of security-software programs include, without limitation, antivirus programs, malicious-software-removal tools, firewall programs, virtualization programs, or the like.

Figure 2:
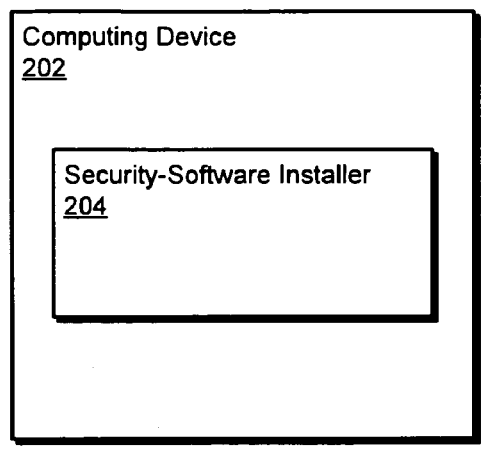
FIG. 2 is a block diagram of an exemplary system for circumventing malicious attempts to block the installation of security software according to an additional embodiment.

The following will provide, with reference to FIGS. 1-2, detailed descriptions of exemplary systems for circumventing malicious attempts to block the installation of security software. Detailed descriptions of corresponding computer-implemented methods will be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for circumventing malicious attempts to block the installation of security software. As illustrated in this figure, exemplary system 100 may comprise one or more modules for performing one or more tasks. For example, and as will be explained in greater detail below, exemplary system 100 may comprise a threat-detection module 104 programmed to: 1) detect, during installation of a security-software program, errors that are indicative of an attack on (i.e., malicious attempts to block the installation of) the security-software program and 2) identify executable files and services that are affected or targeted by the attack.

Exemplary system 100 may also comprise a security module 106 programmed to circumvent the attack by dynamically obfuscating the executable files and services that are affected or targeted by the attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., security-software installer 204 on computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

FIG. 2 is a block diagram of an exemplary system 200 for circumventing malicious attempts to block the installation of security software. As illustrated in this figure, exemplary system 200 may comprise a computing device 202 comprising a security-software installer 204. Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

In one embodiment, and as will be described in greater detail below, security-software installer 204 (which may, as detailed above, comprise one or more of modules 102 in FIG. 1) stored on computing device 202 may circumvent malicious attempts to block the installation of security software on computing device 202 by: 1) detecting, during installation of a security-software program on computing device 202, errors that are indicative of an attack on (i.e., malicious attempts to block the installation of) the security-software program, 2) identifying executable files and services that are affected or targeted by the attack, and then 3) circumventing the attack by dynamically obfuscating the executable files or services that are affected or targeted by the attack.

Figure 3:
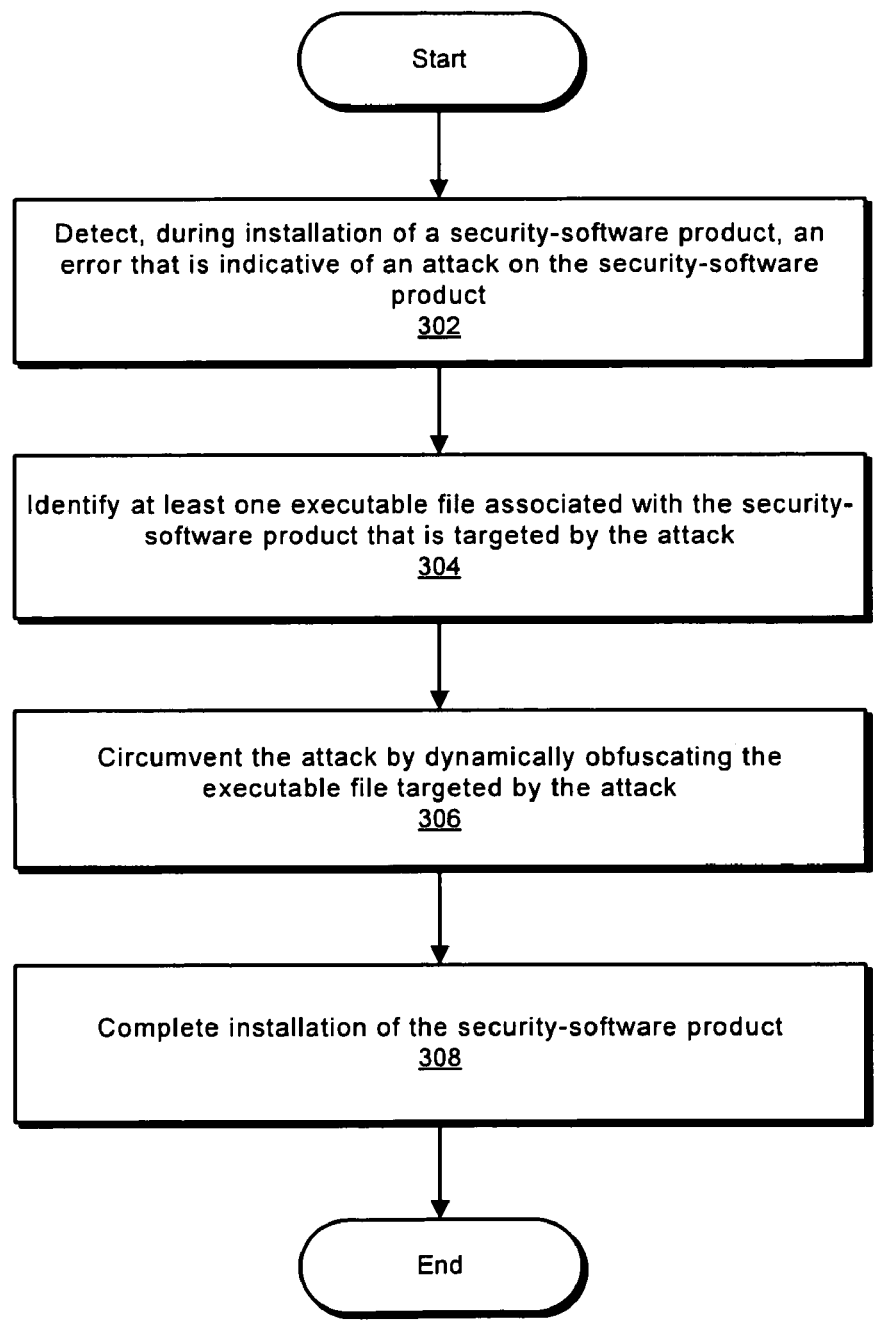
FIG. 3 is a flow diagram of an exemplary method for circumventing malicious attempts to block the installation of security software.

FIG. 3 is a flow diagram of an exemplary computer-implemented method 300 for circumventing malicious attempts to block the installation of security software. As illustrated in this figure, at step 302 the system may detect, during installation of a security-software program, an error that is indicative of an attack on the security-software program. For example, security-software installer 204 in FIG. 2 (which may, as detailed above, comprise threat-detection module 104 in FIG. 1) may detect, during an attempt to install a security-software program on computing device 202, an error that is indicative of a malicious attempt to block installation of the security-software program.

Examples of errors that may be indicative of malicious attempts to block the installation of security software include, without limitation, failed attempts to launch executable files that are associated with the security-software program, failed attempts to register services that are associated with the security-software program, failed attempts to create reference points (e.g., registry keys, INI files, proprietary settings, or the like) associated with the security-software program, or any other failed attempt to install any portion of the security-software program that may indicate a malicious attempt to block installation of the security-software program.

At step 304, the system may identify at least one executable file associated with the security-software program that is targeted or affected by the attack. For example, security-software installer 204 in FIG. 2 (which may, as detailed above, comprise threat-detection module 104 in FIG. 1) may identify an executable file that was blocked or prevented from launching when security-software installer 204 in FIG. 2 attempted to install the security software on computing device 202.

The phrase "executable file," as used herein, generally refers to any type or form of file or service that may be launched or executed when installing a security-software program. Examples of executable files include, without limitation, EXE files, shared-library files (such as DLL files in WINDOWS), kernel drivers (such as SYS files in WINDOWS), service-registration files, operating-system services, resources or files called or launched by installation packages, or the like.

At step 306, the system may circumvent the attack detected in step 302 by dynamically obfuscating the executable file targeted or affected by the attack. For example, security-software installer 204 in FIG. 2 (which may, as detailed above, comprise security module 106 in FIG. 1) may circumvent the attack by dynamically obfuscating the executable file that was blocked or prevented from launching during the attempted installation of the security-software program.

Figure 4:
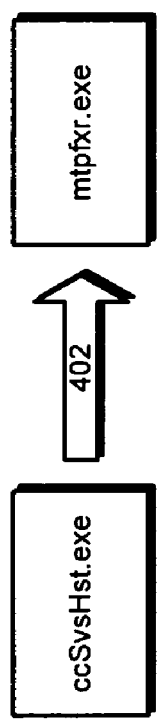
FIGS. 4 and 5 are illustrations of exemplary methods for circumventing malicious attempts to block the installation of security software.

The phrase "dynamically obfuscate," as used herein, generally refers to an operation that obfuscates the identity or origin of an executable file or service in response to a detected attempt to block or prevent the file or service from launching or executing. The systems described herein may dynamically obfuscate files and services in a variety of ways. In one example, the system may dynamically obfuscate an executable file by dynamically renaming the executable file. For example, as illustrated in FIG. 4, security-software installer 204 may, upon detecting an attempt to block or prevent the executable file "ccSvsHst.exe" from launching, rename the executable file from "ccSvsHst.exe" to "mtpfxr.exe" (act 402 in FIG. 4).

In some examples, the system may dynamically rename executable files using a random-name generator. In other examples, the system may dynamically rename affected executable files based on a predetermined heuristic or algorithm. In the latter example, the system may avoid generating filenames that contain common substrings or text that may be easily searched for or otherwise identified.

Figure 5:
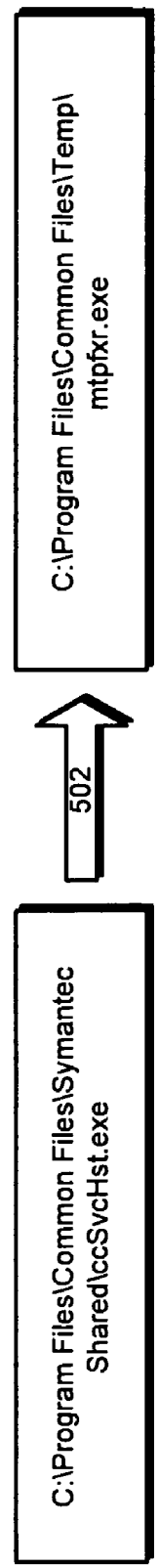

In an additional example, the system may dynamically obfuscate an executable file by dynamically modifying the installation path for the executable file. For example, as illustrated in FIG. 5, the system may change the installation path for the file "ccSvsHst.exe" from "C:\Program Files\Common Files\Symantec Shared\ccSvcHst.exe" to "C:\Program Files\Common Files\Temp\mtpfxr.exe." As with the prior example, the system may modify the installation path of an executable file using a random-path generator or based on a predetermined heuristic or algorithm. In the latter example, the system may remove well-known keywords (such as "NORTON," "SYMANTEC," "Security," or the like) from the installation path in order to avoid detection by malware.

In additional examples, the system may dynamically obfuscate executable files by: 1) dynamically creating a symbolic link to the executable file, 2) copying the executable file, 3) modifying at least one property of the executable file, and/or 4) any other act that may obfuscate the origin or identity of the file. For example, the system may dynamically obfuscate an executable file by removing or stripping a digital certificate from the file (digitally signed, for example, by a certificate authority), by removing version information from the file, or the like.

In some examples, the system may also dynamically obfuscate at least one reference point associated with the executable file identified in step 304. Examples of reference points associated with executable files that may be obfuscated include, without limitation, registry keys, operating-system configuration files (such as INI files), proprietary settings associated with executable files, service-registration files, or the like. As with the executable files themselves, the system may dynamically obfuscate reference points associated with executable files by dynamically renaming the reference points, dynamically modifying installation paths for the reference points, dynamically creating symbolic links to the reference points, modifying properties of the reference points, or the like. In addition, in examples where the executable file represents a service-registration file, the system may remove an operating-system service name referenced by the service-registration file from the service-registration file.

Returning to FIG. 3, at step 308 the system may, upon circumventing the attack, complete installation of the security-software program. For example, security-software installer 204 in FIG. 2 may complete installation of security-software program on computing device 202. Upon completion of step 308 in FIG. 3, exemplary method 300 may terminate.

Although not illustrated in FIG. 3, in certain examples exemplary method 300 may also comprise: 1) detecting a security threat that is the source of the attack detected in step 302 and then 2) neutralizing or removing the security threat. The system may detect and remove security threats in a variety of ways, including through the use of conventional virus-detection and removal tools.

Upon neutralizing or removing the detected security threat, the system may restore the executable file to its original state. For example, the system may restore the executable file to its original name, place the executable file in its original installation path, remove symbolic links to the executable file, restore version information to the executable file, add previously-removed digital certificates back into the executable file, restore any reference points associated with the executable file that have been modified back to their original state, or perform any other act that may assist in restoring the executable file to its original state. The system may attempt to restore executable files and associated reference points upon launching the security-software program, upon launching a malware-detection engine of the security-software program, upon booting the computing device, or at any other suitable time.

In some examples, exemplary method 308 in FIG. 3 may be performed at times other than during installation of a security-software program. For example, the system may, after a security-software program has been successfully installed on a device, continually monitor the security-software program for errors that may be indicative of an attack on the security-software program (i.e., errors that may be indicative of malicious attempts to prevent the security-software program from operating or performing its intended function). In this example, exemplary method 300 may be initiated upon launching the security-software program or upon booting the computing device.

Because the systems and methods described herein may obfuscate executable files and services upon detecting a malicious attempt to block the same from launching, these systems and methods may prevent malicious programmers from blocking security-software files and services by name since malicious programmers may be unable to ascertain the run-time name of these files and services. As such, the systems and methods and methods described herein may successfully circumvent malicious attempts to block the install of security software.

Figure 6:
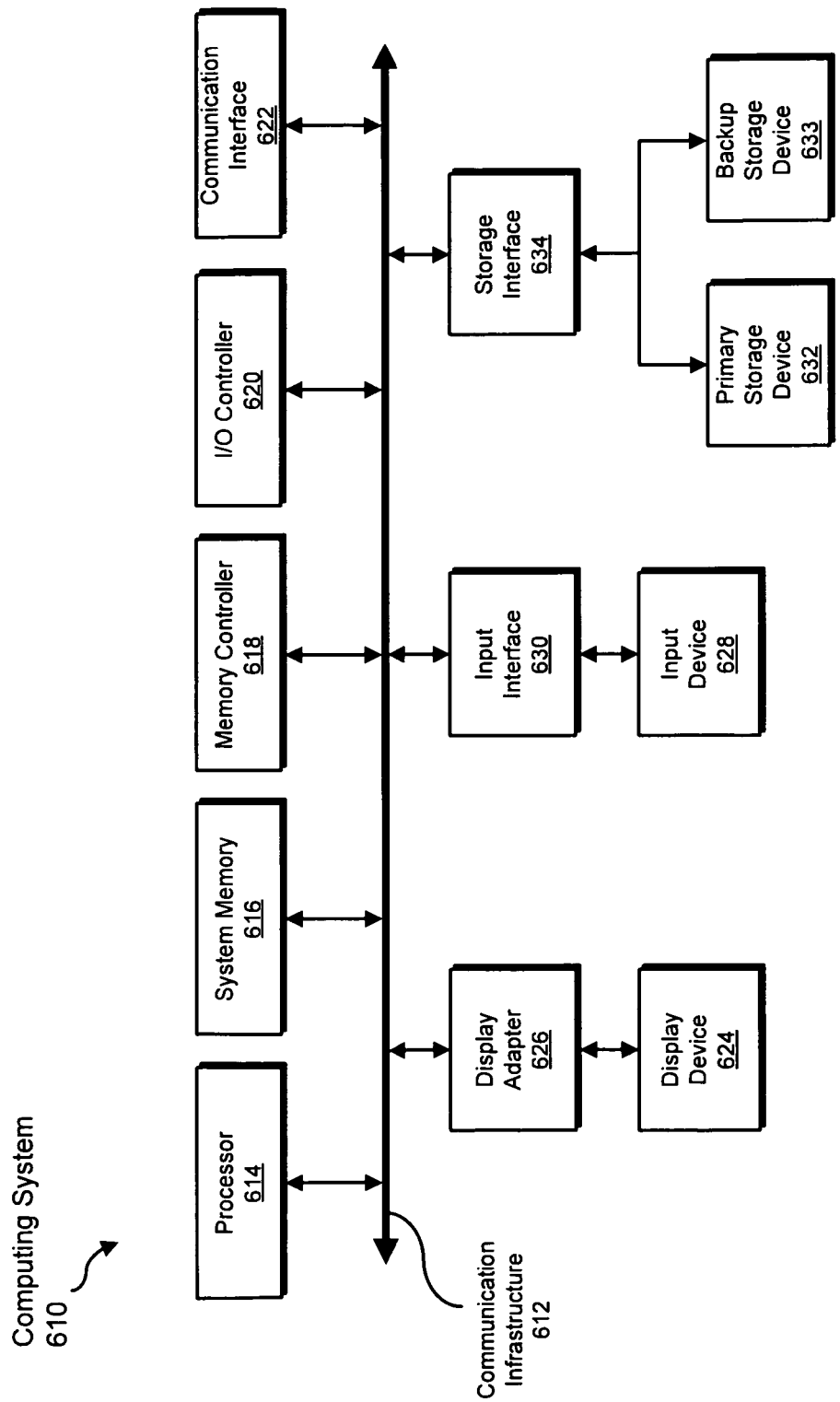
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the detecting, identifying, circumventing, obfuscating, installing, renaming, modifying, creating, executing, copying, removing, neutralizing, and restoring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as detecting, identifying, circumventing, obfuscating, installing, renaming, modifying, creating, executing, copying, removing, neutralizing, and restoring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the detecting, identifying, circumventing, obfuscating, installing, renaming, modifying, creating, executing, copying, removing, neutralizing, and restoring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the detecting, identifying, circumventing, obfuscating, installing, renaming, modifying, creating, executing, copying, removing, neutralizing, and restoring steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the detecting, identifying, circumventing, obfuscating, installing, renaming, modifying, creating, executing, copying, removing, neutralizing, and restoring steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the detecting, identifying, circumventing, obfuscating, installing, renaming, modifying, creating, executing, copying, removing, neutralizing, and restoring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
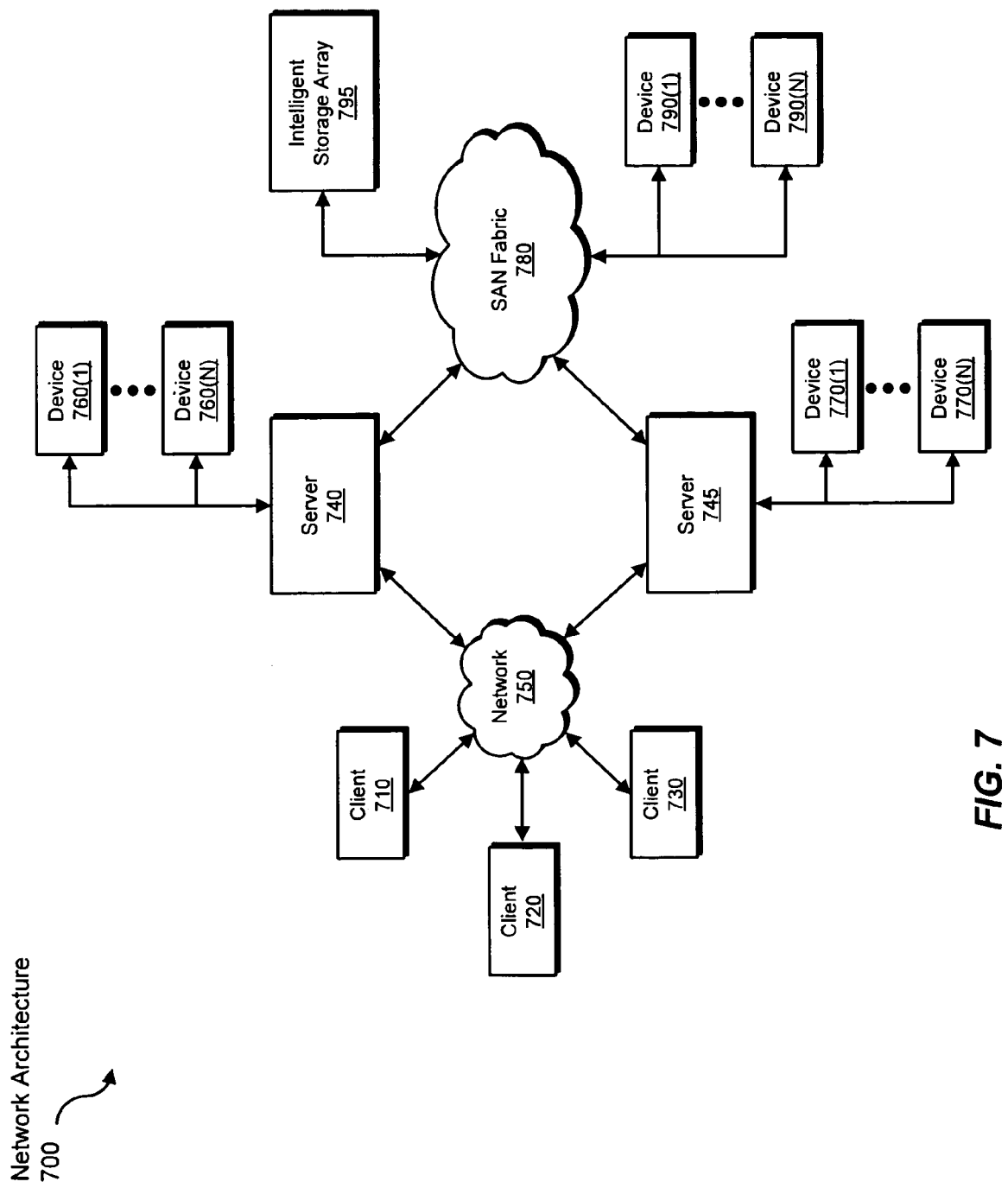
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for detecting, identifying, circumventing, obfuscating, installing, renaming, modifying, creating, executing, copying, removing, neutralizing, and restoring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for circumventing malicious attempts to block the installation of security software. Such a method may comprise: 1) detecting, during installation of a security-software program, an error that is indicative of an attack on the security-software program, 2) identifying at least one executable file targeted by the attack on the security-software program, 3) circumventing the attack by dynamically obfuscating the executable file targeted by the attack, and then 4) completing installation of the security-software program.

Dynamically obfuscating the executable file targeted by the attack may comprise dynamically renaming the executable file, dynamically modifying an install path for the executable file, dynamically creating a symbolic link to the executable file, copying the executable file, and/or modifying at least one property of the executable file (by, for example, removing version information from the executable file and/or removing a digital certificate from the executable file).

Dynamically obfuscating the executable file targeted by the attack may also comprise dynamically obfuscating at least one reference point associated with the executable file. Examples of such reference points include, without limitation, registry keys associated with the executable file, operating-system configuration files associated with the executable file, proprietary settings associated with the executable file, and/or service-registration files associated with the executable file.

In some examples, the method may also comprise: 1) detecting a security threat that is the source of the attack and then 2) neutralizing the security threat. The method may also comprise, upon neutralizing the security threat, restoring the executable file and its associated reference points to their original state.

In one example, the executable file may represent a service-registration file. In this example, dynamically obfuscating the service-registration file may comprise removing an operating-system service name referenced by the service-registration file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for circumventing malicious attempts to block the installation of security software, the method comprising:
   detecting, during installation of a security-software program, an error that is indicative of an attack on the security-software program;
   identifying at least one executable file targeted by the attack on the security-software program;
   in response to detecting the error that is indicative of the attack, circumventing the attack by dynamically obfuscating the executable file targeted by the attack by:
      creating a symbolic link to the executable file;
      dynamically obfuscating at least one reference point associated with the executable file;
   completing installation of the security-software program;
   wherein the method is performed by a computing device comprising at least one processor.

2. The method of claim 1, wherein dynamically obfuscating the executable file targeted by the attack further comprises at least one of:
   dynamically renaming the executable file;
   dynamically modifying an install path for the executable file;
   copying the executable file;
   dynamically modifying at least one property of the executable file.

3. The method of claim 2, wherein dynamically modifying the property of the executable file comprises at least one of:
   removing version information from the executable file;
   removing a digital certificate from the executable file.

4. The method of claim 1, wherein the reference point associated with the executable file comprises at least one of:
   registry keys associated with the executable file;
   operating-system configuration files associated with the executable file;
   proprietary settings associated with the executable file;
   service-registration files associated with the executable file.

5. The method of claim 1, further comprising:
   detecting a security threat that is the source of the attack;
   neutralizing the security threat.

6. The method of claim 5, further comprising, upon neutralizing the security threat, restoring the executable file to its original state.

7. The method of claim 6, further comprising restoring the reference point associated with the executable file to its original state.

8. The method of claim 1, wherein the executable file comprises a service-registration file.

9. The method of claim 8, wherein dynamically obfuscating the executable file comprises removing an operating-system service name referenced by the service-registration file.

10. A system for circumventing malicious attempts to block the installation of security-software programs, the system comprising:
    a threat-detection module programmed to:
       detect, during installation of a security-software program, an error that is indicative of an attack on the security-software program;
       identify at least one executable file targeted by the attack on the security-software program;
    a security module programmed to:
       in response to detecting the error that is indicative of the attack, circumvent the attack by dynamically obfuscating the executable file targeted by the attack by:
          creating a symbolic link to the executable file;
          dynamically obfuscating at least one reference point associated with the executable file;
       complete installation of the security-software program;
    at least one processor configured to execute the threat-detection module and the security module.

11. The system of claim 10, wherein the security module further dynamically obfuscates the executable file targeted by the attack by at least one of:
dynamically renaming the executable file;
dynamically modifying an install path for the executable file;
copying the executable file;
dynamically modifying at least one property of the executable file.

12. The system of claim 11, wherein the security module dynamically modifies the property of the executable file by at least one of:
removing version information from the executable file;
removing a digital certificate from the executable file.

13. The system of claim 10, wherein the security module is further programmed to:
detect a security threat that is the source of the attack;
neutralize the security threat.

14. The system of claim 13, wherein the security module is further programmed to, upon neutralizing the security threat, restore the executable file to its original state.

15. The system of claim 14, wherein the security module is further programmed to restore the reference point associated with the executable file to its original state.

16. The system of claim 10, wherein the executable file comprises a service-registration file.

17. The system of claim 16, wherein the security module dynamically obfuscates the executable file by removing an operating-system service name referenced by the service-registration file.

18. A non-transitory computer-readable medium comprising computer-executable instructions that, when executed by a processor of a computing device, cause the computing device to:
detect, during installation of a security-software program, an error that is indicative of an attack on the security-software program;
identify at least one executable file targeted by the attack on the security-software program;
in response to detecting the error that is indicative of the attack, circumvent the attack by dynamically obfuscating the executable file targeted by the attack by:
creating a symbolic link to the executable file;
dynamically obfuscating at least one reference point associated with the executable file;
complete installation of the security-software program.

* * * * *